US010334388B2

(12) United States Patent
Koga

(10) Patent No.: US 10,334,388 B2
(45) Date of Patent: Jun. 25, 2019

(54) INFORMATION PROCESSING APPARATUS, INFORMATION PROCESSING METHOD, AND PROGRAM

(75) Inventor: Yasuyuki Koga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 655 days.

(21) Appl. No.: 13/490,241

(22) Filed: Jun. 6, 2012

(65) Prior Publication Data

US 2012/0314871 A1 Dec. 13, 2012

(30) Foreign Application Priority Data

Jun. 13, 2011 (JP) ................................ 2011-131142

(51) Int. Cl.
*H04R 5/00* (2006.01)
*H04S 7/00* (2006.01)
*H04B 1/00* (2006.01)

(52) U.S. Cl.
CPC ........ *H04S 7/304* (2013.01); *H04R 2227/003* (2013.01); *H04R 2460/07* (2013.01); *H04S 2400/03* (2013.01); *H04S 2420/01* (2013.01)

(58) Field of Classification Search
CPC ......... H04S 1/002; H04S 3/002; H04R 27/00; H04R 2420/07; H04R 2460/07; G01C 21/3655; G01C 21/3629; G01C 21/3697
USPC ............... 381/17, 310, 86, 74; 701/428, 400
See application file for complete search history.

(56) References Cited

U.S. PATENT DOCUMENTS 8,422,693 B1* 4/2013 Daily et al. ...................... 381/86
2006/0034463 A1* 2/2006 Tillotson .............. G08G 5/0095 381/1
2009/0326814 A1* 12/2009 Harumoto .......... G01C 21/3655 701/414
2010/0268453 A1* 10/2010 Otani ................. G01C 21/3629 701/533

(Continued)

FOREIGN PATENT DOCUMENTS

JP 2002-131072 5/2002
JP 2003-177033 6/2003

(Continued)

OTHER PUBLICATIONS

Mar. 17, 2015, JP communication issued for related JP application No. 2011-131142.

*Primary Examiner* — Xu Mei
*Assistant Examiner* — Ammar T Hamid
(74) *Attorney, Agent, or Firm* — Paratus Law Group, PLLC

(57) ABSTRACT

An information processing apparatus includes a storage, a sensor, a controller, and a sound output unit. The storage is capable of storing a plurality of sound information items associated with respective positions. The sensor is capable of detecting a displacement of one of the information processing apparatus and a user of the information processing apparatus. The controller is capable of extracting at least one sound information satisfying a predetermined condition out of the plurality of stored sound information items and generating, based on the detected displacement, multichannel sound information obtained by localizing the extracted sound information at the associated position. The sound output unit is capable of converting the generated multichannel sound information into stereo sound information and outputting it.

14 Claims, 12 Drawing Sheets

(56) References Cited

U.S. PATENT DOCUMENTS

2011/0106595 A1* 5/2011 Vande Velde .......... G06Q 30/02
705/14.4

FOREIGN PATENT DOCUMENTS

| | | |
|---|---|---|
| JP | 2007-334609 | 6/2006 |
| JP | 2007-215228 | 4/2007 |
| JP | 2008-151766 | 7/2008 |
| JP | 2010-004361 | 1/2010 |
| JP | 2010-136864 | 6/2010 |

* cited by examiner

INFORMATION PROCESSING APPARATUS, INFORMATION PROCESSING METHOD, AND PROGRAM

BACKGROUND

The present disclosure relates to an information processing apparatus capable of spatially arranging sound information and outputting it, and an information processing method and a program for the information processing apparatus.

In recent years, an amount of information that a user obtains is on the increase. Along with a mobilization of information terminals, the user is capable of constantly connecting to the Internet in one's home or even outside and obtaining information. Therefore, how the user extracts requisite information from those information items and presents it is important.

Information that the user obtains from an information terminal connected to the Internet is roughly categorized into visual information and sound information. Regarding the visual information, due to a development of a video display technique including improvements of an image quality and resolution and an advancement of graphics expressions, there are a large number of presentation techniques for intuitive and easy-to-understand information. On the other hand, regarding the sound information, there is a technique that prompts an intuitive comprehension by a set of sound and display. However, the user generally carries the information terminal in his/her pocket or bag while moving outside, and it is dangerous to continue watching a display unit of the information terminal while moving.

Regarding the presentation technique for information using only sound, while there is a technique in a limited field such as a navigation system, the technique has not developed that much in general. Japanese Patent Application Laid-open No. 2008-151766 (hereinafter, referred to as Patent Document 1) discloses a stereophonic sound control apparatus that obtains distance information and direction information to a preset position from position information and orientation information of an apparatus body, outputs those information items as localization information of sound, and performs stereophonic sound processing on sound data based on the localization information. By applying such an apparatus to a car navigation system, for example, it becomes possible to give a listener a directional instruction (guide, distinguishment, warning, etc.) in a sound format that can be intuitively understood by hearing.

SUMMARY

By the technique disclosed in Patent Document 1, however, sound information presented to the user is merely a directional instruction, and other information cannot be presented by sound. Moreover, there may be unnecessary information that the user has already grasped in the sound information presented to the user in Patent Document 1, and thus the user may feel ungracious.

In view of the circumstances as described above, there is a need for an information processing apparatus, an information processing method, and a program with which a user can intuitively understand requisite information as sound information.

According to an embodiment of the present disclosure, there is provided an information processing apparatus including a storage, a sensor, a controller, and a sound output unit. The storage is capable of storing a plurality of sound information items associated with respective positions. The sensor is capable of detecting a displacement of one of the information processing apparatus and a user of the information processing apparatus. The controller is capable of extracting at least one sound information satisfying a predetermined condition out of the plurality of stored sound information items and generating, based on the detected displacement, multichannel sound information obtained by localizing the extracted sound information at the associated position. The sound output unit is capable of converting the generated multichannel sound information into stereo sound information and outputting it.

With this structure, since the information processing apparatus localizes the sound information after filtering it based on the predetermined condition and outputs it, the user can intuitively understand requisite information as sound information. The multichannel sound information used herein is sound information of 3 or more channels and is, for example, 5.1-channel sound information. Further, the information processing apparatus may include, as a constituent element, headphones (stereophones or earphones) that the user puts on. When the information processing apparatus is constituted of a body and headphones, the sensor may be provided in either one. Moreover, the controller may be provided in the headphones. The "displacement" is a concept including various changes of a position, direction, velocity, and the like.

The sensor may be capable of detecting one of a position and orientation of one of the information processing apparatus and the user. In this case, the controller may be capable of extracting the sound information under the predetermined condition that the position with which the sound information is associated is within one of a predetermined distance range and a predetermined orientation range from the position of one of the information processing apparatus and the user.

With this structure, the information processing apparatus can present, so that the user can hear it from that direction, only the sound information associated with a position that the user might be interested in since it is, for example, in front of the user or near the user. The extracted sound information may be information on a shop or facility or an AR (Augmented Reality) marker associated with the information on a shop or facility.

At least one of the plurality of sound information items may be associated with a predetermined movement velocity of one of the information processing apparatus and the user. In this case, the sensor may be capable of detecting the movement velocity of one of the information processing apparatus and the user. Also in this case, the controller may be capable of extracting the sound information under the predetermined condition that the sound information is associated with the detected movement velocity.

With this structure, the information processing apparatus can change a filtering mode of the sound information according to the movement velocity of the user and provide the user the sound information corresponding to the movement velocity. For example, when shop information is provided as the sound information, only a keyword such as a shop name may be provided in a case where the movement velocity of the user is relatively high, and information on a recommended menu, an evaluation of the shop, and the like may be provided in addition to the shop name in a case where the movement velocity of the user is relatively low.

At least one of the plurality of sound information items may be associated with a virtual position that is a predetermined distance from a predetermined initial position of one of the information processing apparatus and the user. In this case, the sensor may be capable of detecting a movement distance of one of the information processing apparatus and the user from the initial position. Also in this case, the controller may be capable of extracting the sound information under the predetermined condition that a position reached by moving an amount corresponding to the detected movement distance has come within a predetermined distance range from the virtual position.

With this structure, the information processing apparatus can provide the user certain sound information for the first time when the user has moved a predetermined distance. For example, the information processing apparatus can output certain sound information when the user has reached a distance corresponding to a predetermined checkpoint while running.

At least one of the plurality of sound information items may be associated with a position of a virtual object that moves at a predetermined velocity from a predetermined initial position in the same direction as one of the information processing apparatus and the user. In this case, the sensor may be capable of detecting a movement distance of one of the information processing apparatus and the user from the initial position. Also in this case, the controller may extract the sound information under the predetermined condition that the sound information is associated with the position of the virtual object, and localize the extracted sound information at the position of the virtual object being moved based on a position calculated from the detected movement distance.

With this structure, the information processing apparatus can allow the user to experience, for example, a virtual race with a virtual object during running. The virtual object used herein may be a target runner for the user, and the extracted sound information may be footsteps or breathing sound of the runner.

At least one of the plurality of sound information items may be associated with a first position of a predetermined moving object. In this case, the sensor may be capable of detecting a position of the moving object and a second position of one of the information processing apparatus and the user. Also in this case, the controller may extract the sound information under the predetermined condition that the sound information is associated with the position of the moving object, and localize the extracted sound information at the first position when the detected first position is within a predetermined range from the detected second position.

With this structure, the information processing apparatus can notify the user that the moving object is approaching the user and a direction of the moving object by the sound information. The moving object used herein is, for example, a vehicle, and the sound information is, for example, sound of an engine of the vehicle, a warning tone notifying a danger, or the like. Nowadays, by a prevalence of electric vehicles, vehicles that do not emit engine sound is increasing, and the user may not be able to realize that a vehicle is approaching when the user is wearing headphones in particular. However, with the structure described above, the user can sense the approach of a vehicle and avoid the danger.

The information processing apparatus may further include a communication unit capable of establishing audio communication with another information processing apparatus. In this case, at least one of the plurality of sound information items may be associated with a position at which the communication unit has started audio communication with the another information processing apparatus. Also in this case, the sensor may be capable of detecting a movement direction and a movement distance of one of the information processing apparatus and the user from the position at which the audio communication has been started. Also in this case, the controller may extract the sound information under the predetermined condition that the sound information is associated with the position at which the audio communication has been started, and localize the extracted sound information at the position at which the audio communication has been started based on a position reached by moving an amount corresponding to the movement distance from the position at which the audio communication has been started in the movement direction.

With this structure, the information processing apparatus can provide the user an experience that an audio communication counterpart exists at the position at which the audio communication has been started. For example, with this structure, when the user moves away from the position at which the audio communication has been started, sound of the audio communication counterpart is heard from its original position and a volume thereof becomes small.

According to another embodiment of the present disclosure, there is provided an information processing apparatus including a communication unit, a storage, a controller. The communication unit is capable of communicating with another information processing apparatus. The storage is capable of storing a plurality of sound information items associated with respective positions. The controller is capable of controlling the communication unit to receive, from the another information processing apparatus, displacement information indicating a displacement of one of the another information processing apparatus and a user of the another information processing apparatus, extracting at least one sound information satisfying a predetermined condition out of the plurality of stored sound information items, and generating, based on the received displacement information, multichannel sound information obtained by localizing the extracted sound information at the associated position.

According to another embodiment of the present disclosure, there is provided an information processing method for an information processing apparatus, including storing a plurality of sound information items associated with respective positions. A displacement of one of the information processing apparatus and a user of the information processing apparatus is detected. At least one sound information satisfying a predetermined condition is extracted out of the plurality of stored sound information items. Based on the detected displacement, multichannel sound information obtained by localizing the extracted sound information at the associated position is generated. The generated multichannel sound information is converted into stereo sound information and output.

According to another embodiment of the present disclosure, there is provided a program that causes an information processing apparatus to execute the steps of: storing a plurality of sound information items associated with respective positions; detecting a displacement of one of the information processing apparatus and a user of the information processing apparatus; extracting at least one sound information satisfying a predetermined condition out of the plurality of stored sound information items; generating, based on the detected displacement, multichannel sound information obtained by localizing the extracted sound information at the associated position; and converting the generated multichannel sound information into stereo sound information and outputting it.

As described above, according to the embodiments of the present disclosure, a user can intuitively understand requisite information as sound information.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

[Structure of Portable Terminal]

Figure 1:
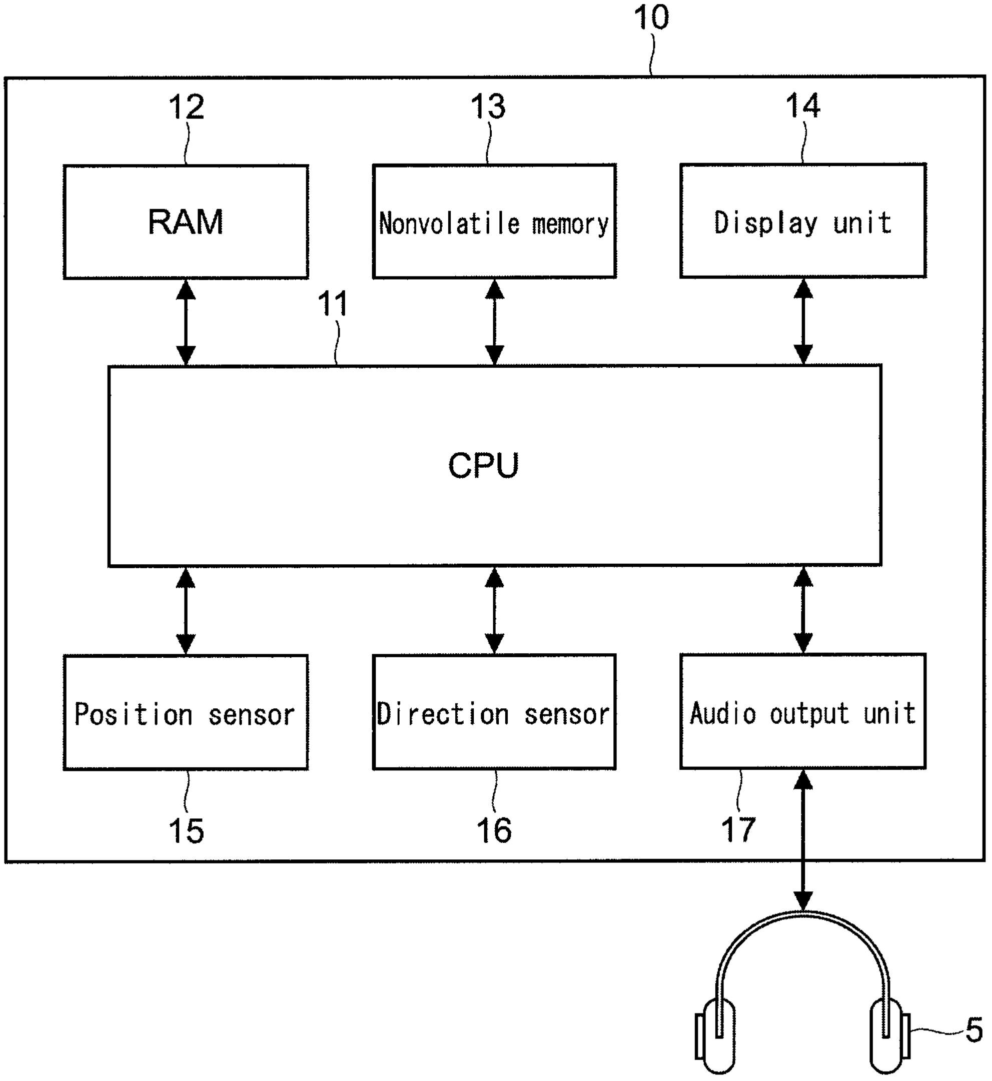
FIG. 1 is a diagram showing a hardware structure of a portable terminal according to an embodiment of the present disclosure.

FIG. 1 is a diagram showing a hardware structure of a portable terminal according to an embodiment of the present disclosure. Specifically, the portable terminal is an information processing apparatus such as a smartphone, a cellular phone, a tablet PC (Personal Computer), a PDA (Personal Digital Assistant), a portable AV player, and an electronic book.

As shown in the figure, a portable terminal 10 includes a CPU (Central Processing Unit) 11, a RAM (Random Access Memory) 12, a nonvolatile memory 13, a display unit 14, a position sensor 15, a direction sensor 16, and an audio output unit 17.

The CPU 11 accesses the RAM 12 and the like as necessary and controls the entire blocks of the portable terminal 10 while carrying out various types of operational processing. The RAM 12 is used as a working area of the CPU 11 and temporarily stores an OS, various applications that are being executed, and various types of data that are being processed.

The nonvolatile memory 13 is, for example, a flash memory or a ROM and fixedly stores firmware such as an OS to be executed by the CPU 11, programs (applications), and various parameters. The nonvolatile memory 13 also stores various types of sound data (sound source) that are output from headphones 5 via sound localization processing to be described later.

The display unit 14 is, for example, an LCD or an OELD and displays various menus, application GUIs, and the like. The display unit 14 may be integrated with a touch panel.

The position sensor 15 is, for example, a GPS (Global Positioning System) sensor. The position sensor 15 receives a GPS signal transmitted from a GPS satellite and outputs it to the CPU 11. Based on the GPS signal, the CPU 11 detects a current position of the portable terminal 10. Not only position information in a horizontal direction but also position information in a vertical direction (height) may be detected from the GPS signal. Alternatively, the portable terminal 10 may detect a current position thereof without using the GPS sensor by carrying out trilateration with respect to a base station through wireless communication using a communication unit (not shown). Moreover, the portable terminal 10 does not constantly need to be carried by a user, and the portable terminal 10 may be located apart from the user. In this case, some kind of a sensor is carried or worn by the user, and the portable terminal 10 can detect a current position of the user by receiving an output of the sensor.

The direction sensor 16 is, for example, a geomagnetic sensor, an angular velocity (gyro) sensor, or an acceleration sensor and detects a direction that the user is facing. The direction sensor 16 is provided in the headphones 5, for example. In this case, the direction sensor 16 is a sensor that detects a direction of a face of the user. Alternatively, the direction sensor 16 may be provided in the portable terminal 10. In this case, the direction sensor 16 is a sensor that detects a direction of a body of the user. The direction sensor 16 may be carried or worn separate from the portable terminal 10, and a direction of the user may be detected as the portable terminal 10 receives an output of the direction sensor 16. The detected direction information is output to the CPU 11. In a case where the portable terminal 10 has a built-in camera, the direction of the face may be detected by an image analysis based on an image of the face of the user taken by the camera.

The audio output unit 17 converts multichannel sound data that has been subjected to the sound localization processing by the CPU 11 into stereo sound and outputs it to the headphones 5. A connection between the audio output unit 17 and the headphones 5 may either be a wired connection or a wireless connection. The “headphones” used herein is a concept including sterephones that cover both ears and earphones that are inserted into both ears.

Here, the audio output unit 17 is capable of carrying out the sound localization processing using, for example, a VPT (Virtual Phones Technology: Trademark) developed by the applicant in cooperation with the CPU 11 (http://www.sony.co.jp/Products/vpt/, http://www.sony.net/Products/vpt/). VPT is a system obtained by refining the principle of a binaural sound pickup reproduction system using a head-tracking technique that corrects, in real time, an HRTR (Head Related Transfer Function) from a sound source to both ears by making it synchronize with a head movement, and the like and is a virtual surround technique that artificially reproduces multichannel (e.g., 5.1 channel) sound for 3 or more channels by headphones for 2 channels.

Although not shown, the portable terminal 10 may also include a communication unit for establishing communication or audio communication with other portable terminals, a camera, and a timer (clock).

[General Overview of Operation of Portable Terminal]

Next, an operation of the portable terminal 10 structured as described above will be described. This operation is carried out in cooperation with other hardware and software (applications) under control of the CPU 11.

The portable terminal 10 of this embodiment presents specific information to the user based on information on a position and face (headphones 5) direction of a user (portable terminal 10 or headphones 5), a movement distance, a movement velocity, a time, and the like under the presupposition that the sound localization processing using VPT and the like is carried out. In such a case, for presenting the user only requisite sound information, the portable terminal 10 filters sound information under a predetermined condition before subjecting it to the sound localization processing.

As a specific example of the filtering processing, there are, for example, (1) processing that is based on a genre or preference information of a user added to sound information, (2) processing that is based on whether a position of sound information is within predetermined angle range or distance range with respect to a user, and (3) processing that is based on a movement velocity of a user, though not limited thereto.

The sound information presentation processing of this embodiment is roughly classified into processing that is based on a relative position of sound information (sound source) with respect to a position of a user and processing that is based on an absolute position of sound information.

FIG. 2 are diagrams showing a brief overview of the processing that is based on a relative position of sound information. As shown in the figure, the portable terminal 10 moves a position of a sound source A that is present at a position relative to (actually or virtually) a position of a user U (headphones 5) according to a change of a movement distance and movement velocity of the user U (headphones 5). Then, the portable terminal 10 carries out the sound localization processing so that sound can be heard by ears of the user from the position of the moving sound source A.

Figures 2A, 2B, 2C:
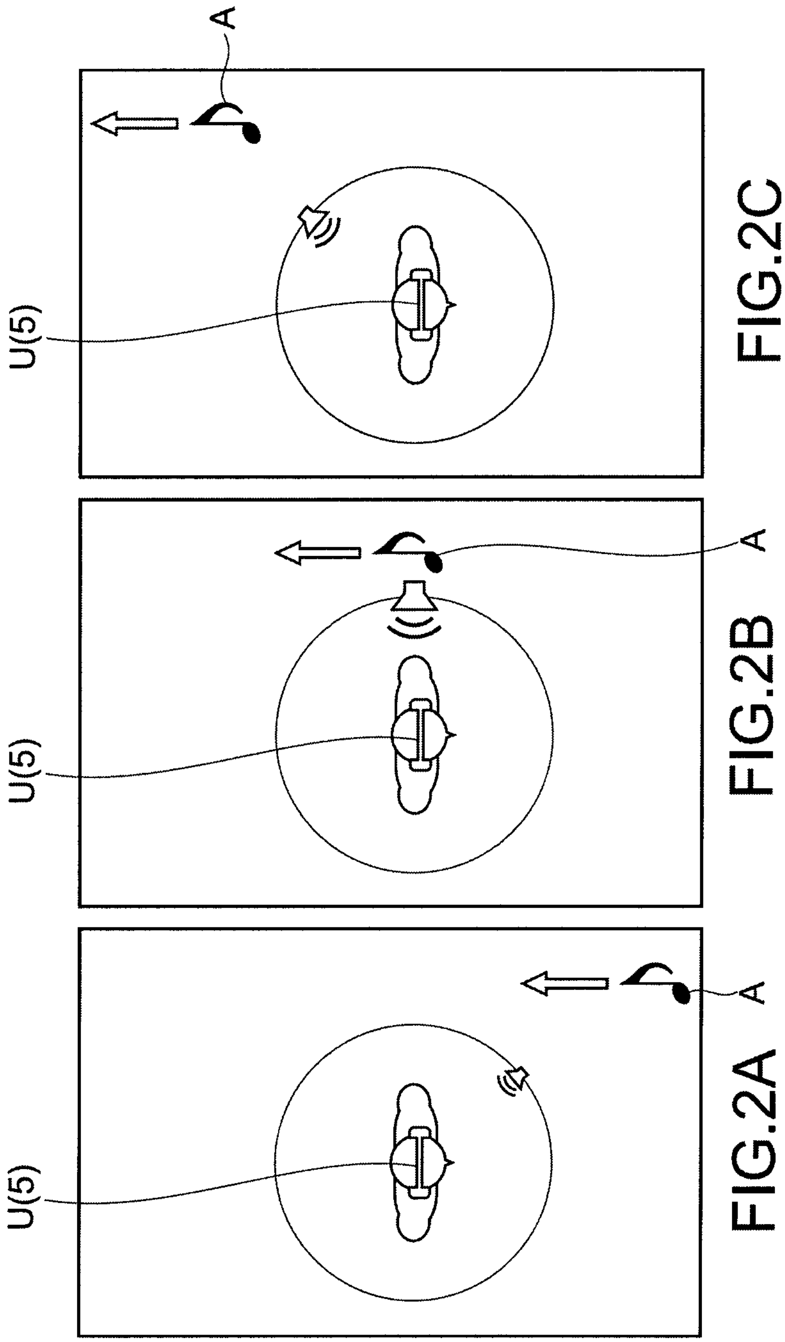
FIG. 2 are diagrams showing a brief overview of processing that is based on a relative position of sound information according to the embodiment of the present disclosure.

For example, in FIG. 2A, processing of making the sound information A heard in a small volume from a front direction on the left of the user U is carried out. After that, as shown in FIG. 2B, processing of making the sound information A heard in a large volume from the immediate left of the user U is carried out. After that, as shown in FIG. 2C, processing of making the sound information A heard in a small volume from a back direction on the left of the user U is carried out. As a result, a feeling of the sound information A approaching the user U from the front direction on the left and moving away after that or a feeling of the user U approaching the sound source A in the front direction on the left and overtaking it can be imparted to the user U.

In this case, the sound source A may move in a state where the user U is not moving, the user U may move in a state where the sound source A is not moving, or both may move. The sound localization processing is carried out based on a relative positional relationship between the user U and the sound source A.

FIG. 3 are diagrams showing a brief overview of the processing that is based on an absolute position of the sound information. As shown in the figures, sound localization processing that makes the sound source A that is present at a specific position on earth heard from the specific position according to the position of the user or the direction that the user is facing is carried out.

Figure 3A:
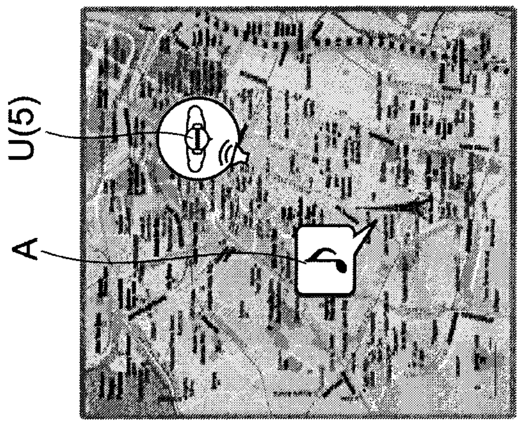
FIG. 3 are diagrams showing a brief overview of processing that is based on an absolute position of the sound information according to the embodiment of the present disclosure.
Figure 3B:
Figure 3C:
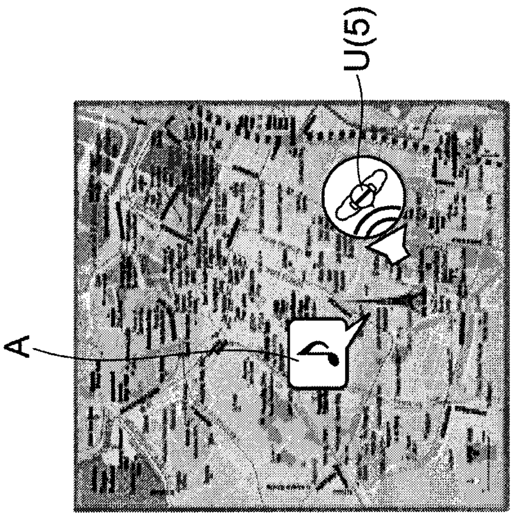

For example, in FIG. 3A, the sound source A is heard in a small volume from the front direction of the user U. In FIG. 3B, the sound source A is heard in a large volume from the front direction on the right of the user U. In FIG. 3C, the sound source A is heard in an additionally-large volume from the front of the user U.

Hereinafter, the two processing will be described based on specific examples.

[Details of Sound Information Presentation Based on Relative Position]

First, the sound information presentation processing that is based on a relative position of the user U and the sound source A will be described. In this processing, after the sound information is filtered under a predetermined condition, whether there is information to be presented to the user is judged. Here, the information related to a direction of the face of the user does not need to be used, and the position of the sound source may move based on relationships among the movement velocity, movement distance, movement time, and the like of the user U and the sound information.

First Specific Example

In this example, processing that is carried out while the user U is exercising by running, cycling, or the like in a state where the user U is wearing the headphones 5 and carrying the portable terminal 10 will be discussed. A position of sound of a target (virtual object) that moves at a target velocity changes according to the movement velocity of the user during exercise, and the user U overtakes the target or the target catches up with the user U. Accordingly, the user can virtually compete with the target. Here, the sound presented to the user is footsteps or breathing sound that auditorily indicates the presence of the target, though not limited thereto. The running or cycling may be one that uses a machine or one that runs an actual course.

Figure 4:
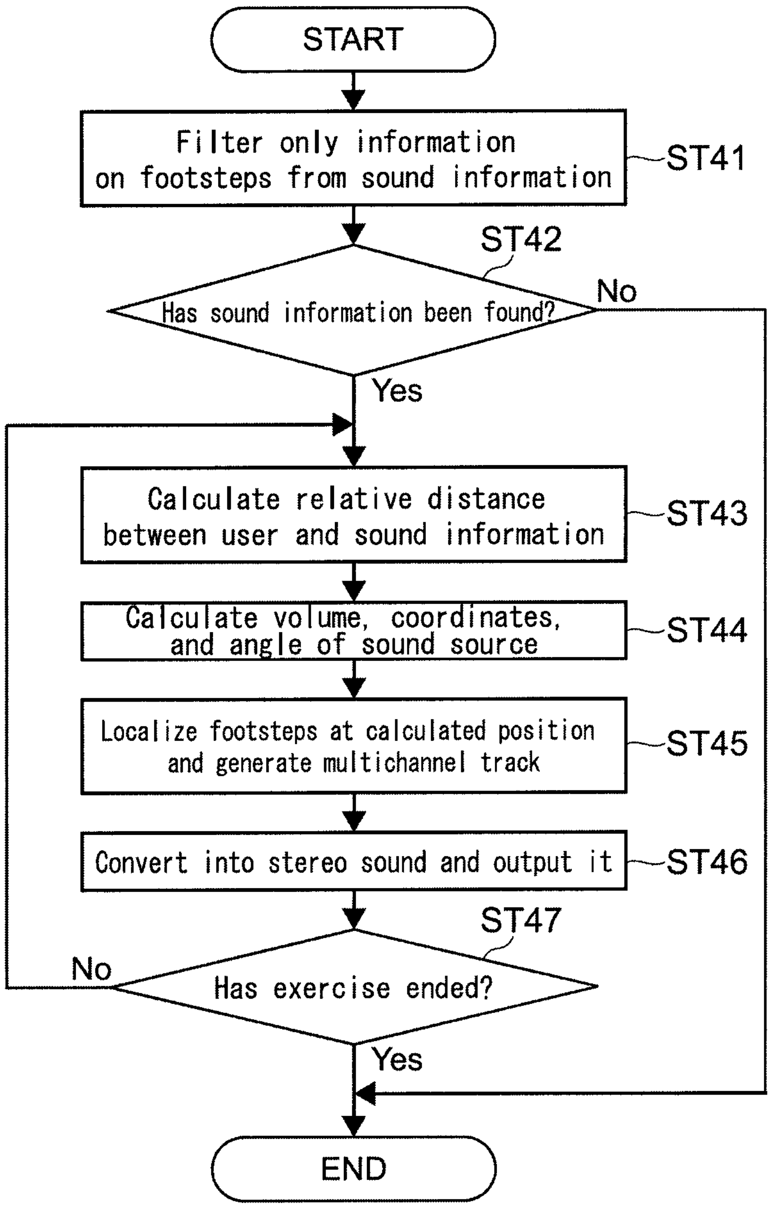
FIG. 4 is a flowchart showing a flow of a first specific example of sound information presentation processing based on a relative position according to the embodiment of the present disclosure.

FIG. 4 is a flowchart showing a flow of the first specific example. In the processing, the user U sets a target at a target velocity via the display unit 14 of the portable terminal 10, a setting screen of a machine, or the like and instructs an exercise start with respect to an application of the portable terminal 10. The target may start running simultaneous with the user U or start running before the user U.

As shown in the figure, the CPU 11 of the portable terminal 10 filters only information on footsteps from the nonvolatile memory 13 (Step 41).

When the information on footsteps is found by the filtering processing (Yes in Step 42), the CPU 11 calculates a relative distance between the user U and the sound information (target) (Step 43).

For calculating the relative distance, when the user U is running an actual course, for example, position information output from the position sensor 15 at the exercise start time point and the calculated time point, elapse time information with respect to the exercise start, and the like are used. Specifically, while the running distance of the user U from the exercise start time point to the calculated time point is calculated from the output of the position sensor 15, a virtual running distance of the target at a certain time point is calculated from the elapse time and the set target velocity, and thus a difference between the two distances is calculated as the relative distance. Alternatively, the running distance of the user U may be calculated using an output of the direction sensor 16 (e.g., acceleration sensor) instead of the output of the position sensor 15.

When a machine is used for the exercise, the running distance of the user may be received from the machine by the portable terminal 10 through, for example, wireless communication.

Subsequently, the CPU 11 calculates a volume, coordinates, and angle of the sound source (footsteps) based on the calculated relative distance (Step 44). Here, the sound source moves in the same direction as the user U. In other words, the sound source may exist at any position in a traveling direction (front-back direction) of the user U.

Next, the CPU 11 localizes the footsteps at the calculated coordinate position and generates a multichannel track (Step 45). Then, the CPU 11 converts the multichannel track into stereo sound by the audio output unit 17 and outputs it to the headphones 5 (Step 46).

The CPU 11 repetitively executes the processing described above until an exercise end is instructed by the user U (Step 47).

FIG. 5 are diagrams for explaining the first specific example.

Figure 5A:
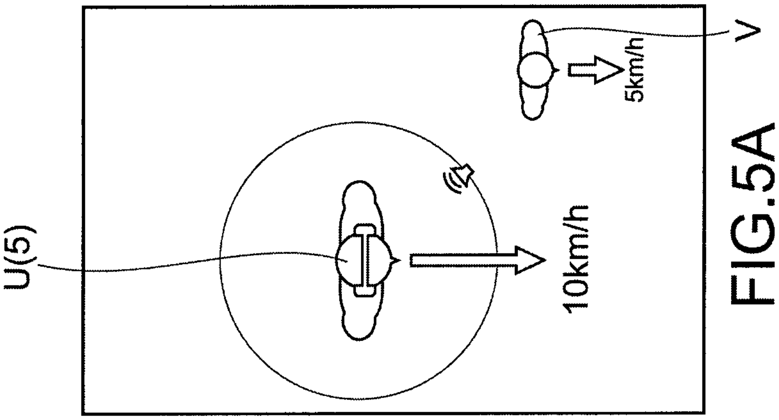
FIG. 5 are diagrams for explaining the first specific example of the sound information presentation processing based on a relative position according to the embodiment of the present disclosure.
Figure 5B:
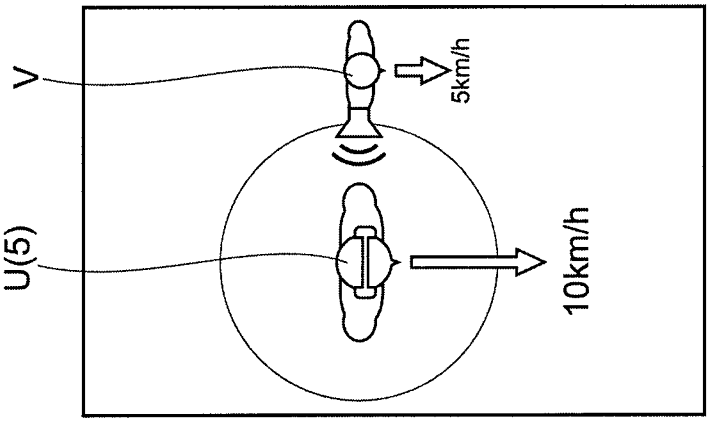
Figure 5C:
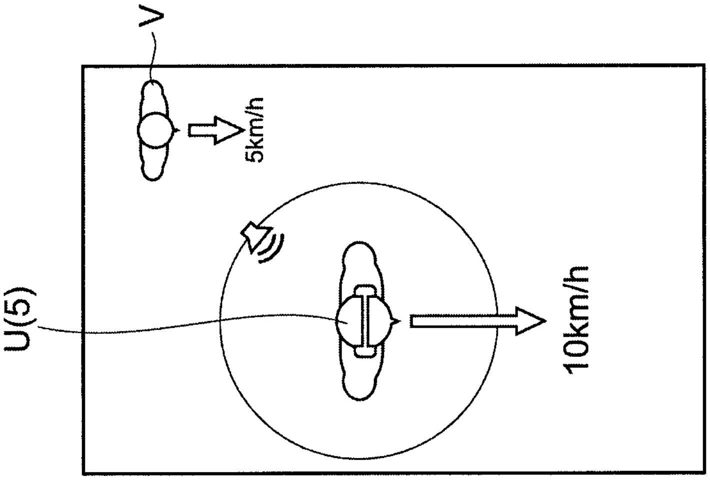

For example, in a case where a setting velocity of a target (sound source) V is 5 km/h, the target V starts running before the user U, and the user U starts running at 10 km/h after that, footsteps are localized so that they are heard from the front direction of the user at a small volume in the beginning as shown in FIG. 5A. After that, as the user U continues running, the footsteps gradually become larger and reach a maximum volume at a position closest to the user U (e.g., left-hand side) as shown in FIG. 5B. Then, as shown in FIG. 5C, the footsteps are localized so that they are heard from the back direction of the user while the volume thereof gradually becomes smaller. As a result, the user U can auditorily obtain an experience of overtaking the target V while running.

Second Specific Example

Also in this example, processing that is carried out while the user U is exercising by running, cycling, or the like in a state where the user U is wearing the headphones 5 and carrying the portable terminal 10 will be discussed. In this example, it is assumed that sound information is set at a certain distance point (check point) from a start point, and a position and volume of sound change according to a distance with respect to the information. Here, the sound information is a cheering message that occurs every certain distance, a feedback indicating a running distance, and the like. As the user approaches the check point (running distance of user approaches distance up to check point), sound is heard as if it is approaching, and as the user passes the check point (running distance of user exceeds distance up to check point), sound is heard as if it is moving away.

Figure 6:
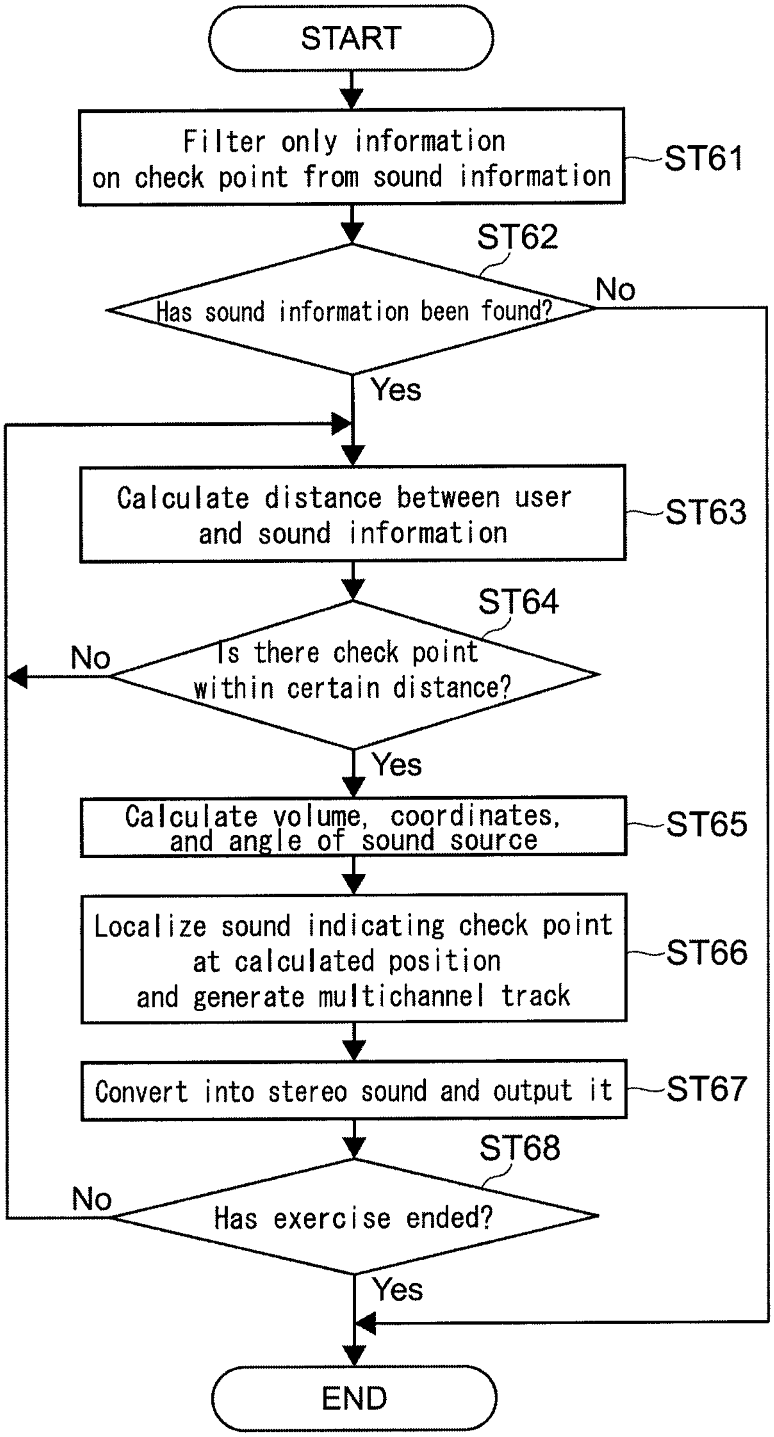
FIG. 6 is a flowchart showing a flow of a second specific example of the sound information presentation processing based on a relative position according to the embodiment of the present disclosure.

FIG. 6 is a flowchart showing a flow of the second specific example. In the processing, the user U instructs an exercise start with respect to an application of the portable terminal 10 via the display unit 14 of the portable terminal 10, a setting screen of a machine, or the like.

As shown in the figure, the CPU 11 of the portable terminal 10 filters only information on a check point from the nonvolatile memory 13 (Step 61).

When the information on a check point is found by the filtering processing (Yes in Step 62), the CPU 11 calculates a distance between the user U and the check point (Step 63). For calculating the distance, the running distance of the user U that has been similarly calculated in the first specific example and a distance preset at the check point are used.

Subsequently, the CPU 11 judges whether there is a check point within a certain distance from the current position of the user U (Step 64). The certain distance is, for example, 100 m, 50 m, and 30 m, though not limited thereto.

When judged that there is a check point within a certain distance (Yes), the CPU 11 calculates a volume, coordinates, and angle of sound indicating the check point based on the calculated distance (Step 65). Here, the sound may exist at any position in the traveling direction (front-back direction) of the user U.

Next, the CPU 11 localizes the sound indicating the check point at the calculated coordinate position and generates a multichannel track (Step 66). Then, the CPU 11 converts the multichannel track into stereo sound and outputs it to the headphones 5 (Step 67).

The CPU 11 repetitively executes the processing described above until an exercise end is instructed by the user U (Step 68).

Third Specific Example

In this example, processing that is carried out while the user U is having audio communication with a user of another portable terminal will be discussed. The portable terminal 10 localizes a position of a voice of the user as the communication counterpart at a spot where the user U has started the audio communication so that, as the user U moves away from that spot during communication, the voice of the user as the communication counterpart is also heard from that position and a volume thereof becomes smaller. As a result, the user can feel a realistic sensation as if the communication counterpart exists at the spot where the audio communication has started.

Figure 7:
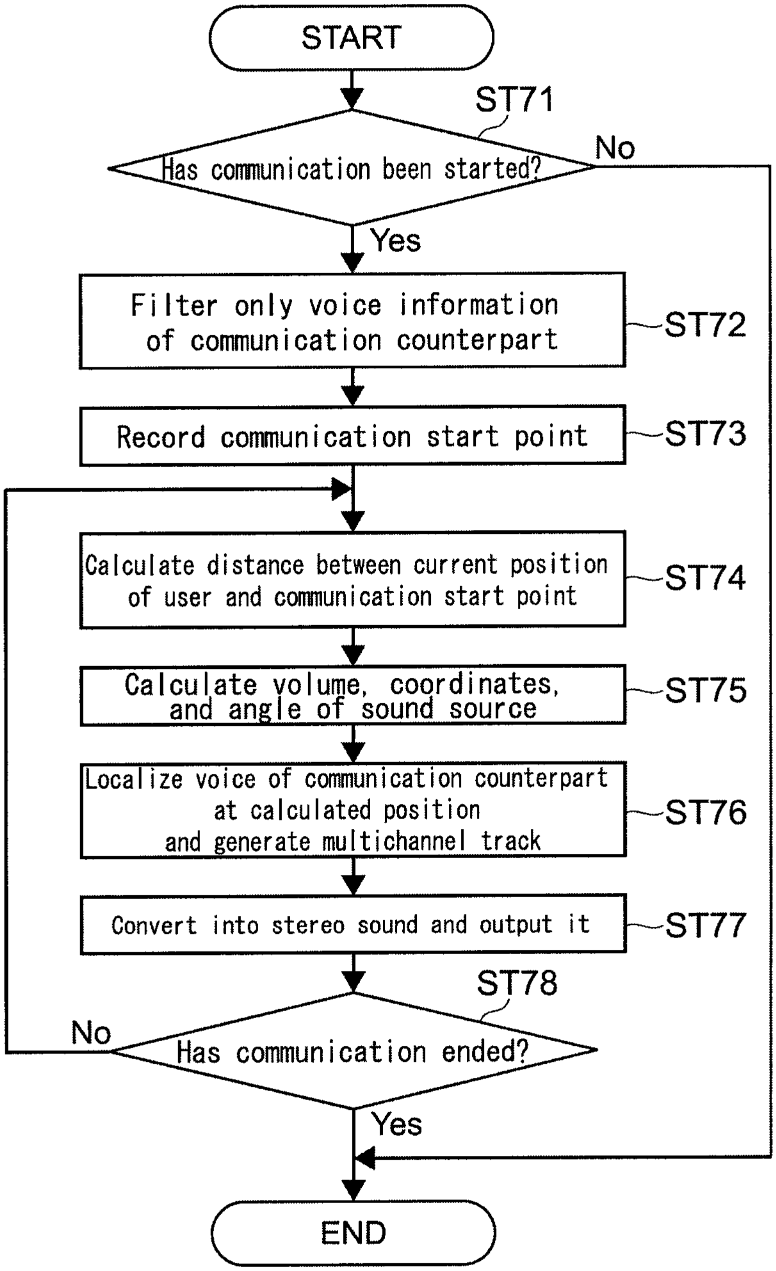
FIG. 7 is a flowchart showing a flow of a third specific example of the sound information presentation processing based on a relative position according to the embodiment of the present disclosure.

FIG. 7 is a flowchart showing a flow of a third specific example.

As shown in the figure, the CPU 11 first judges whether communication with another portable terminal has been started (Step 71). When judged that the communication has been started (Yes), the CPU 11 filters only voice information of the audio communication counterpart (Step 72).

Subsequently, the CPU 11 stores positional coordinates of the spot where the communication has been started based on an output of the position sensor 15 (Step 73).

Then, the CPU 11 calculates the current position of the user U and a distance with respect to the recorded communication start point based on the output of the position sensor 15 (Step 74).

Next, the CPU 11 calculates a volume, coordinates, and angle of the voice of the communication counterpart based on the calculated distance (Step 75). For calculating the angle, an output of the direction sensor 16 is used.

Subsequently, the CPU 11 localizes the sound of the communication counterpart at the calculated coordinate position and generates a multichannel track (Step 76). Then, the CPU 11 converts the multichannel track into stereo sound and outputs it to the headphones 5 (Step 77).

The CPU 11 repetitively executes the processing described above until the communication ends (Step 78).

Figure 8:
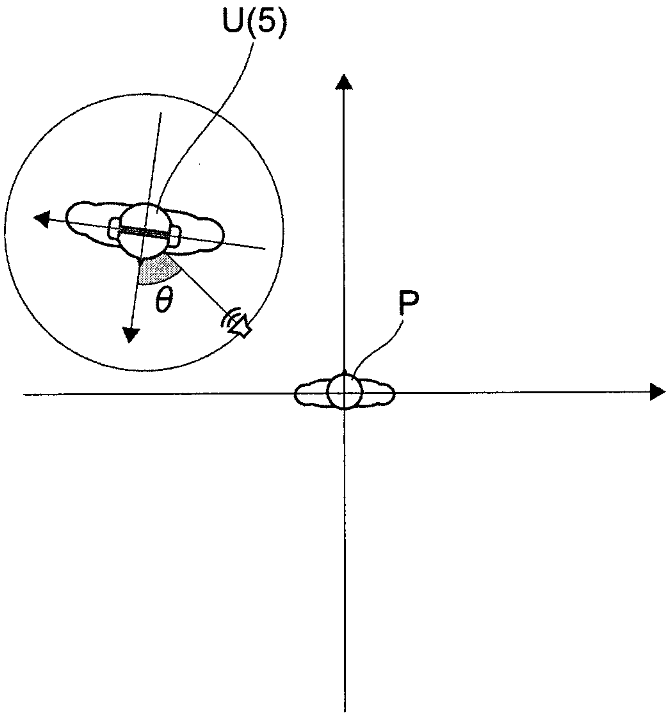
FIG. 8 is a diagram for explaining the third specific example of the sound information presentation processing based on a relative position according to the embodiment of the present disclosure.

FIG. 8 is a diagram for explaining the third specific example. As shown in the figure, after the user U starts communication at a spot P, the user moves to the position shown in the figure and faces the direction shown in the figure (downward direction in figure). In this case, based on the outputs of the position sensor 15 and the direction sensor 16, coordinates of the spot to which the user has moved to, a distance between the moved spot and the communication start spot P, and an angle θ of the moved spot with respect to the communication start spot P are calculated, and sound localization is performed so that the voice of the communication counterpart is heard from the spot P. According to the distance, the volume of the voice of the communication counterpart becomes smaller than that at the time the communication has been started.

[Details of Sound Information Presentation Based on Absolute Position]

Next, sound information presentation processing based on an absolute position of a sound source will be described. In this processing, based on position information and face direction information of the user U, whether there is sound information to be presented to the user is judged as a result of the filtering processing. When there is sound information to be presented, a position to localize sound and a volume thereof are determined based on a relationship between the user U and a distance from sound information that exists fixedly or a direction of the sound information from the user. Two specific examples of this processing will be described below.

First Specific Example

In this example, processing that is carried out when the user U obtains information on a shop or facility while moving outside will be discussed. Assuming that there is a sound content indicating information on a shop or facility at a position where the shop or facility exists, the sound content is localized based on a distance between the user U and the sound content and a direction of the sound content with respect to the user U. As the sound content, in addition to advertisement information, evaluation information, and landmark information of a shop, there is, for example, information indicating a position of an AR marker that indicates the information on a shop or facility, though not limited thereto.

Figure 9:
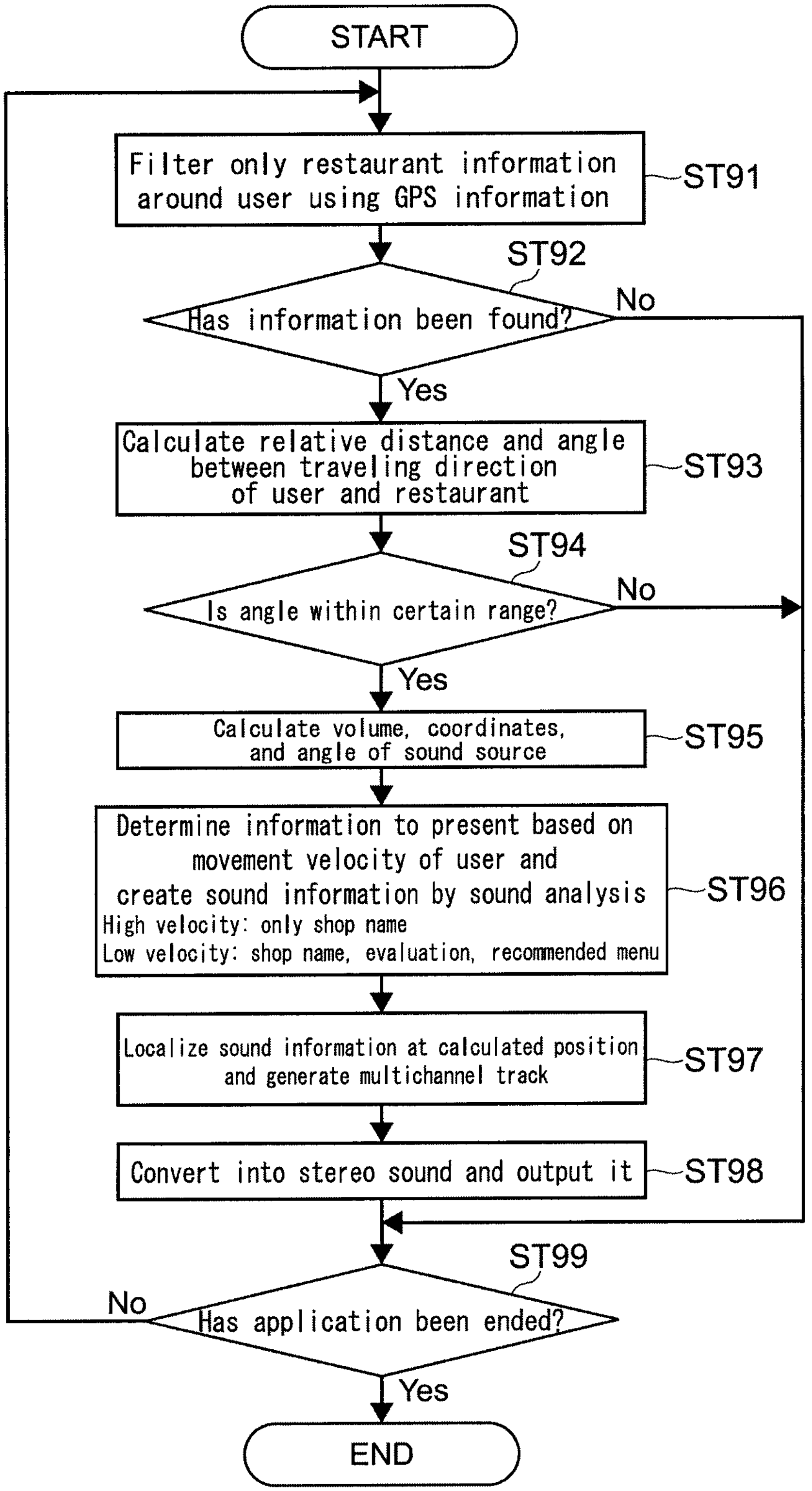
FIG. 9 is a flowchart showing a flow of a first specific example of sound information presentation processing based on an absolute position according to the embodiment of the present disclosure.

FIG. 9 is a flowchart showing a flow of the first specific example. In the flowchart, a case where the portable terminal 10 activates an application, filters only information related to a restaurant that exists in the traveling direction of the user, and changes a granularity of information to be presented according to a movement distance is assumed.

As shown in the figure, the CPU 11 first filters only restaurant information around the user U (e.g., 1 km or 0.5 km radius) using GPS information (position information of portable terminal 10) obtained from the position sensor 15 (Step 91). The restaurant information is associated with actual position information of a restaurant and stored in the nonvolatile memory 13 in advance.

When there is peripheral restaurant information (Yes), the CPU 11 calculates a relative distance and angle between the traveling direction of the user and the restaurant (Step 93). The traveling direction is obtained from an output of the direction sensor 16. The distance and angle are calculated based on the current position information of the portable terminal 10 output from the position sensor 15 and position information (latitude/longitude information) of each restaurant stored in advance.

Subsequently, the CPU 11 judges whether the extracted restaurant exists within a predetermined angle range from the traveling direction of the portable terminal 10 in the horizontal direction (Step 94). The angle range is set to be, for example, ±45 degrees or ±60 degrees in the horizontal direction when the traveling direction is 0 degree, though not limited thereto.

Next, the CPU 11 calculates a volume, coordinates, and angle of sound of the restaurant information based on the calculated distance and angle (Step 95).

Then, the CPU 11 calculates a movement velocity of the user, determines a type of sound information to be presented based on the movement velocity, and generates sound information by a sound synthesis (Step 96). The movement velocity of the user is calculated based on an output of the position sensor 15 at a plurality of spots, for example. Regarding the type of sound information that is based on the movement velocity, it is possible to present only a shop name for the restaurant information when the velocity is high (predetermined velocity or more, e.g., 5 km/h or more) and present evaluation information, recommended menu information, and the like in addition to the shop name when the velocity is low (smaller than predetermined velocity).

Subsequently, the CPU 11 localizes sound of the restaurant information of the determined type at the calculated coordinate position and generates a multichannel track (Step 97). Then, the CPU 11 converts the multichannel track into stereo sound and outputs it to the headphones 5 (Step 98).

The CPU 11 repetitively executes the processing described above until the application ends (Step 99).

FIG. 10 are diagrams for explaining the first specific example.

Figure 10A:
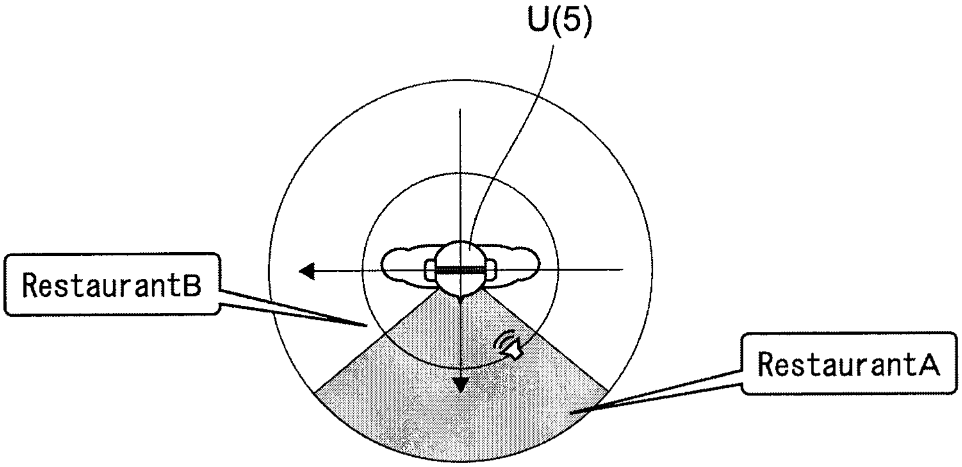
FIG. 10 are diagrams for explaining the first specific example of the sound information presentation processing based on an absolute position according to the embodiment of the present disclosure.

In the example shown in FIG. 10A, (information on) a restaurant A exists within a predetermined angle range (front direction on left) from the traveling direction of the user U. Therefore, the information on the restaurant A is presented from that direction. On the other hand, since (information on) a restaurant B is outside the predetermined angle range, the information on the restaurant B is not presented.

Figure 10B:
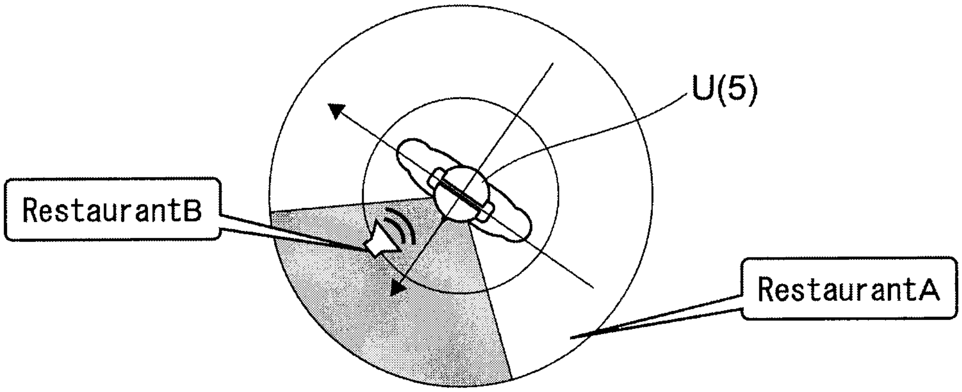

The example shown in FIG. 10B shows a case where the traveling direction of the user U is shifted slightly to the right from the state shown in FIG. 10A. In this case, since the restaurant A is outside the predetermined angle range, the information thereof is not presented. On the other hand, since the restaurant B is within the predetermined angle range, the information thereof is presented. Further, since a distance between the user U and the restaurant B is smaller than a distance between the user U and the restaurant A, the information on the restaurant B is presented with a larger volume than the information on the restaurant A presented in FIG. 10A.

By the processing as described above, the user can obtain the information on a shop or facility that exists in the traveling direction from a position corresponding to a direction and distance thereof. When the information is an AR marker, the user can obtain specific information on a shop or facility by directing a built-in camera (not shown) of the portable terminal 10 in a direction in which sound has been presented and taking a picture in that direction.

Second Specific Example

In this example, processing that is carried out when a predetermined moving object such as a vehicle approaches the user U while the user U is moving on a road or the like will be discussed. Nowadays, by a prevalence of electric vehicles, vehicles that do not emit engine sound is increasing, and the user may not be able to realize that a vehicle is approaching when the user is wearing the headphones 5 in particular. In this example, by presenting sound information attached with a direction for warning the user U based on position information of a vehicle in such a case, it becomes possible to cause the user to sense the approach of the vehicle and avoid the danger.

Figure 11:
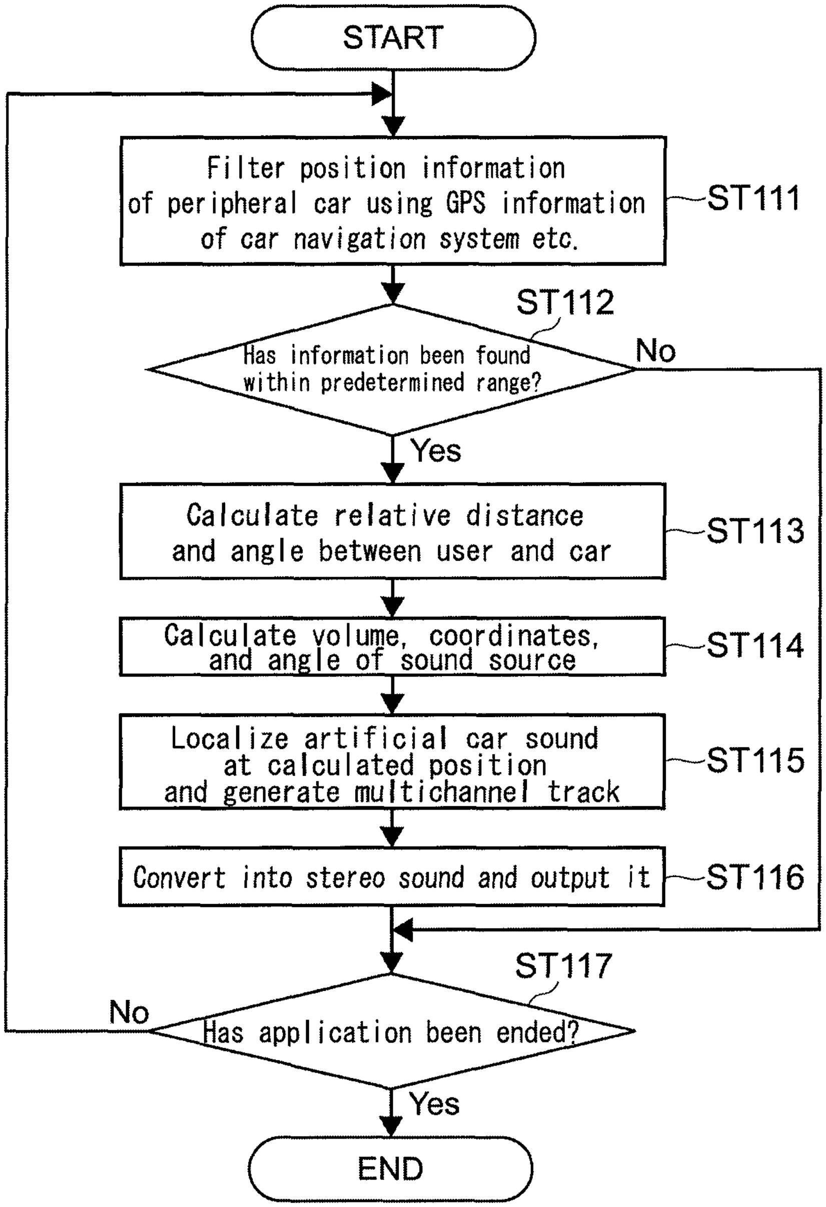
FIG. 11 is a flowchart showing a flow of a second specific example of the sound information presentation processing based on an absolute position according to the embodiment of the present disclosure.

FIG. 11 is a flowchart showing a flow of the second specific example.

As shown in the figure, the CPU 11 first filters position information of a car that exists in the periphery (e.g., within 100 m radius) of the user U (Step 111). For the filtering processing, the portable terminal 10 receives GPS position information received by a car navigation system mounted to a peripheral car and judges whether the position information is within a predetermined range from the position of the portable terminal 10.

When there is a car within a predetermined range (Yes in Step 112), the CPU 11 calculates a relative distance and angle between the user U (portable terminal 10) and the car (Step 113). The distance and angle are calculated based on the current position information of the portable terminal 10 output from the position sensor 15 and the received position information of the car.

Subsequently, the CPU 11 calculates a volume, coordinates, and angle of an artificial car sound (horn sound) based on the calculated distance and angle (Step 114).

Then, the CPU 11 localizes the artificial car sound at the calculated coordinate position and generates a multichannel track (Step 115). Then, the CPU 11 converts the multichannel track into stereo sound and outputs it to the headphones 5 (Step 116).

Here, since the user U may be unable to avoid the danger even when the artificial car sound is presented while the car is close to the user, the portable terminal 10 may carry out the sound localization processing such that the predetermined range is widened and the artificial car sound is heard at a closer position than the actual car position.

The CPU 11 repetitively executes the processing described above until the application ends (Step 117).

FIG. 12 are diagrams for explaining the second specific example.

Figure 12A:
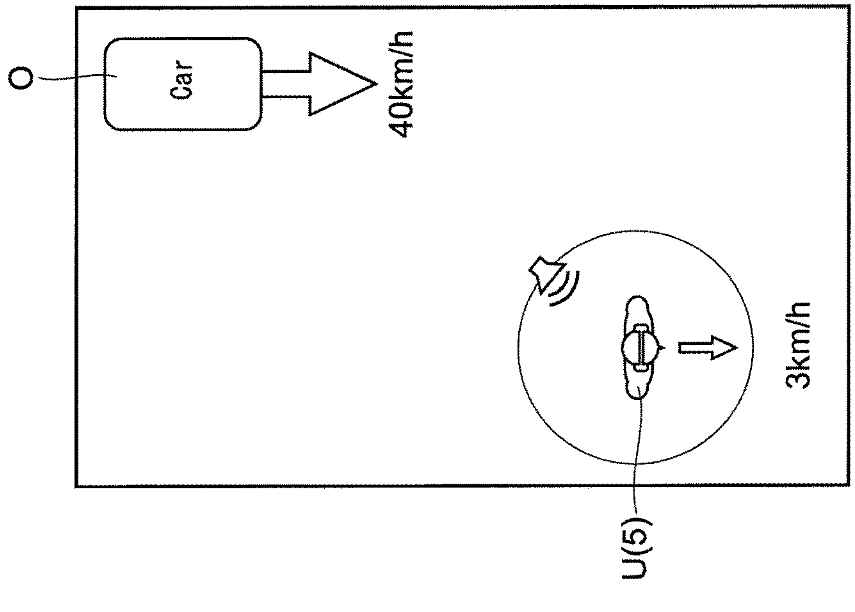
FIG. 12 are diagrams for explaining the second specific example of the sound information presentation processing based on an absolute position according to the embodiment of the present disclosure.

As shown in FIG. 12A, when a car 0 approaches from behind at 40 km/h while the user U is walking at, for example, 3 km/h, the sound localization processing is carried out such that the artificial car sound is heard from a position of the car behind the user.

Figure 12B:
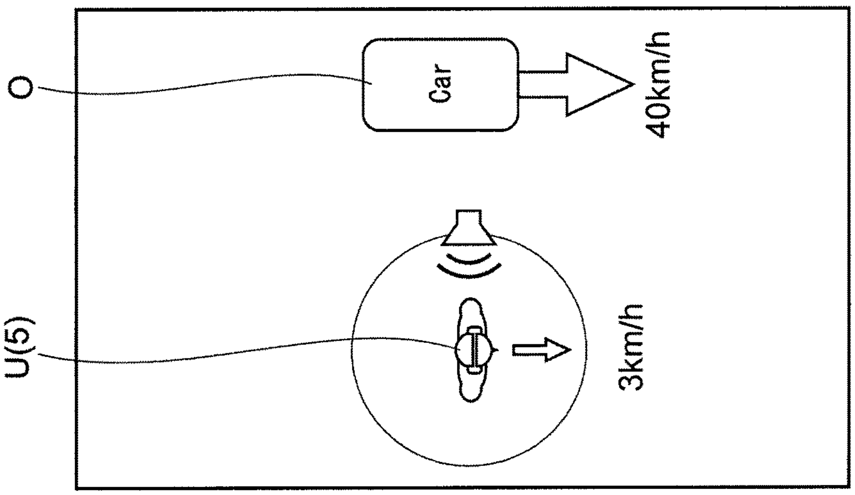

Next, as shown in FIG. 12B, when the car 0 comes closest to the user U, the sound localization processing is carried out such that the artificial car sound is heard from a nearest position (e.g., from side).

Figure 12C:
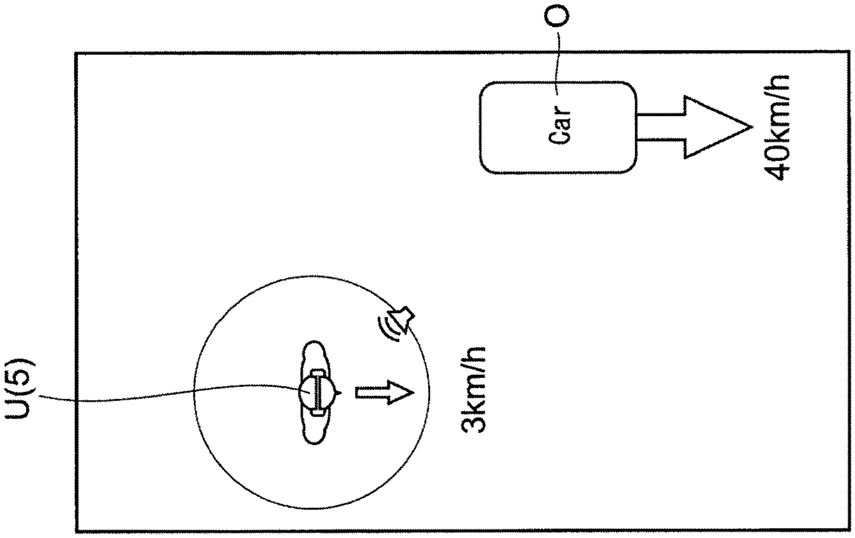

Then, as shown in FIG. 12C, when the car 0 overtakes the user U and moves in front of the user U, the sound localization processing is carried out such that the artificial car sound is heard from the front at a small volume.

[Summary]

As described above, according to this embodiment, since the portable terminal 10 filters sound information based on a predetermined condition before localizing and outputting it, the user can intuitively understand requisite information as sound information.

Modified Example

The present disclosure is not limited to the embodiment described above and can be variously modified without departing from the gist of the present disclosure.

The filtering condition for sound information is not limited to those described in the specific examples above. For example, the portable terminal 10 may store preference information (genre etc.) of a user related to the information and filter sound information based on the preference information.

The sound information to be presented to the user is not limited to those described in the specific examples above. For example, in a case where the portable terminal 10 receives a mail or an instant message or in a case where a new posting is made through a communication tool such as Twitter (trademark), sound notifying it may be presented from a predetermined direction. In this case, the user may arbitrarily set the predetermined direction for each transmission destination or, when position information of the transmission destination can also be received, sound may be presented from a direction corresponding to the actual position information thereof.

The three specific examples described for the processing based on a relative position and the two specific examples described for the processing based on an absolute position are not exclusive and may be mutually combined. For example, it is also possible to present footsteps or breathing sound of a target or information indicating a check point when the user is exercising at a predetermined velocity or more and present shop information or facility information in addition to those described above when the user is exercising at a velocity smaller than the predetermined velocity.

The embodiment above has described the example where the sound localization processing is carried out by the portable terminal 10. However, the processing may be carried out by a cloud-side information processing apparatus (server etc.) that is connectable with the portable terminal 10. The server includes constituent elements necessary for functioning at least as a computer including a storage, a communication unit, and a CPU (controller). The storage stores sound information to be presented to the user. The communication unit receives, from the portable terminal 10, outputs from the position sensor 15 and the direction sensor 16, that is, displacement information of the portable terminal 10 or the user. Then, after filtering sound information based on the predetermined condition, the sound localization processing is carried out based on the displacement information. The thus-generated multichannel sound is transmitted to the portable terminal from the server, converted into stereo sound, and output from the headphones 5 or the like.

The embodiment above has described the example where sound that has been subjected to the sound localization processing is output from the headphones. However, the headphones do not always need to be used. For example, stereo sound converted from the multichannel track may be output from two speakers installed on both sides of the user. For example, when the user uses a machine for the running or cycling, since the user stays at the same place, the sound that has been subjected to the sound localization processing may be presented from the two speakers without the user wearing the headphones 5.

[Others]

It should be noted that the present disclosure may also take the following structures.

(1) An information processing apparatus, including:

a storage capable of storing a plurality of sound information items associated with respective positions;

a sensor capable of detecting a displacement of one of the information processing apparatus and a user of the information processing apparatus;

a controller capable of extracting at least one sound information satisfying a predetermined condition out of the plurality of stored sound information items and generating, based on the detected displacement, multichannel sound information obtained by localizing the extracted sound information at the associated position; and a sound output unit capable of converting the generated multichannel sound information into stereo sound information and outputting it.

(2) The information processing apparatus according to (1), in which the sensor is capable of detecting one of a position and orientation of one of the information processing apparatus and the user, and in which the controller is capable of extracting the sound information under the predetermined condition that the position with which the sound information is associated is within one of a predetermined distance range and a predetermined orientation range from the position of one of the information processing apparatus and the user.

(3) The information processing apparatus according to (1) or (2), in which at least one of the plurality of sound information items is associated with a predetermined movement velocity of one of the information processing apparatus and the user, in which the sensor is capable of detecting the movement velocity of one of the information processing apparatus and the user, and in which the controller is capable of extracting the sound information under the predetermined condition that the sound information is associated with the detected movement velocity.

(4) The information processing apparatus according to any one of (1) to (3), in which at least one of the plurality of sound information items is associated with a virtual position that is a predetermined distance from a predetermined initial position of one of the information processing apparatus and the user, in which the sensor is capable of detecting a movement distance of one of the information processing apparatus and the user from the initial position, and in which the controller is capable of extracting the sound information under the predetermined condition that a position reached by moving an amount corresponding to the detected movement distance has come within a predetermined distance range from the virtual position.

(5) The information processing apparatus according to any one of (1) to (4), in which at least one of the plurality of sound information items is associated with a position of a virtual object that moves at a predetermined velocity from a predetermined initial position in the same direction as one of the information processing apparatus and the user, in which the sensor is capable of detecting a movement distance of one of the information processing apparatus and the user from the initial position, and in which the controller extracts the sound information under the predetermined condition that the sound information is associated with the position of the virtual object, and localizes the extracted sound information at the position of the virtual object being moved based on a position calculated from the detected movement distance.

(6) The information processing apparatus according to any one of (1) to (5), in which at least one of the plurality of sound information items is associated with a first position of a predetermined moving object, in which the sensor is capable of detecting a position of the moving object and a second position of one of the information processing apparatus and the user, and in which the controller extracts the sound information under the predetermined condition that the sound information is associated with the position of the moving object, and localizes the extracted sound information at the first position when the detected first position is within a predetermined range from the detected second position.

(7) The information processing apparatus according to any one of (1) to (6), further including a communication unit capable of establishing audio communication with another information processing apparatus, in which at least one of the plurality of sound information items is associated with a position at which the communication unit has started audio communication with the another information processing apparatus, in which the sensor is capable of detecting a movement direction and a movement distance of one of the information processing apparatus and the user from the position at which the audio communication has been started, and in which the controller extracts the sound information under the predetermined condition that the sound information is associated with the position at which the audio communication has been started, and localizes the extracted sound information at the position at which the audio communication has been started based on a position reached by moving an amount corresponding to the movement distance from the position at which the audio communication has been started in the movement direction.

The present disclosure contains subject matter related to that disclosed in Japanese Priority Patent Application JP 2011-131142 filed in the Japan Patent Office on Jun. 13, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:

a processor configured to:

acquire a movement state; and determine, based on the acquired movement state, a type of sound information to be output associated with a target existing within a predetermined range from a user, wherein the type of sound information includes a first information type or a second information type including more detailed information than the first information type, and wherein the determination of the type of sound information to be output includes determining whether to output the first information type or the second information type based on whether or not the acquired movement state has reached a predetermined velocity.

2. The information processing apparatus according to claim 1, wherein the first information type and the second information type further differ in an amount of information content.

3. The information processing apparatus according to claim 2, wherein the first information type has less information content than the second information type.

4. The information processing apparatus according to claim 1, wherein the movement state is a state of relative movement between the user and the target.

5. The information processing apparatus according to claim 1, wherein the target is located remote from the information processing apparatus.

6. The information processing apparatus according to claim 1, wherein the target is an object of interest.

7. The information processing apparatus according to claim 1, wherein the target is a position of interest.

8. The information processing apparatus according to claim 1, wherein the movement state is associated with a relationship between the target and the information processing apparatus.

9. An information processing method, comprising:

acquiring a movement state; and determining, based on the acquired movement state, a type of sound information to be output associated with a target existing within a predetermined range from a user, wherein the type of sound information includes a first information type or a second information type including more detailed information than the first information type, and wherein the determination of the type of sound information to be output includes determining whether to output the first information type or the second information type based on whether or not the acquired movement state has reached a predetermined velocity.

10. A non-transitory computer-readable medium having embodied thereon a program, which when executed by a computer causes the computer to execute a method, the method comprising:

acquiring a movement state; and determining, based on the acquired movement state, a type of sound information to be output associated with a target existing within a predetermined range from a user, wherein the type of sound information includes a first information type or a second information type including more detailed information than the first information type, and wherein the determination of the type of sound information to be output includes determining whether to output the first information type or the second information type based on whether or not the acquired movement state has reached a predetermined velocity.

11. The information processing apparatus according to claim 1, wherein the movement state is a state of the information processing apparatus.

12. The information processing apparatus according to claim 1, wherein the second information type is of a different hierarchical level of detail than the first information type.

13. The information processing apparatus according to claim 1, wherein the second information type is of a lower hierarchical level of detail than the first information type.

14. The information processing apparatus according to claim 1, wherein the processor is further configured to:

initiate a displaying of a visual object associated with the target.

* * * * *